(12) United States Patent
Landrieve

(10) Patent No.: US 8,840,311 B2
(45) Date of Patent: Sep. 23, 2014

(54) ROLLING BEARING WITH INTEGRATED SENSOR

(75) Inventor: Franck Landrieve, Fondettes (FR)

(73) Assignee: Aktiebolaget SKF, Gothenburg (SE)

( * ) Notice: Subject to any disclaimer, the term of this patent is extended or adjusted under 35 U.S.C. 154(b) by 186 days.

(21) Appl. No.: 13/132,248

(22) PCT Filed: Dec. 2, 2008

(86) PCT No.: PCT/IB2008/055662
§ 371 (c)(1),
(2), (4) Date: Jul. 1, 2011

(87) PCT Pub. No.: WO2010/064088
PCT Pub. Date: Jun. 10, 2010

(65) Prior Publication Data
US 2011/0262067 A1   Oct. 27, 2011

(51) Int. Cl.
| F16C 19/00 | (2006.01) |
| G01P 3/44 | (2006.01) |
| F16C 41/00 | (2006.01) |
| F16C 33/72 | (2006.01) |
| F16C 23/08 | (2006.01) |
| F16C 35/063 | (2006.01) |
| F16C 35/04 | (2006.01) |
| G01P 3/488 | (2006.01) |

(52) U.S. Cl.
CPC ............. *F16C 33/723* (2013.01); *F16C 41/007* (2013.01); *F16C 23/084* (2013.01); *F16C 35/063* (2013.01); *G01P 3/443* (2013.01); *F16C 35/045* (2013.01); *F16C 2326/58* (2013.01); *G01P 3/488* (2013.01)
USPC .......................................... 384/448; 384/498

(58) Field of Classification Search
USPC ................................... 384/448, 489, 495, 537
See application file for complete search history.

(56) References Cited

U.S. PATENT DOCUMENTS

| 4,090,099 | A |   | 5/1978 | Daffron |
| 5,051,693 | A |   | 9/1991 | Brauer |
| 5,711,618 | A |   | 1/1998 | Waskiewicz |
| 6,007,250 | A | * | 12/1999 | Brauer et al. ................. 384/448 |
| 6,908,410 | B2 | * | 6/2005 | Ishikawa ......................... 476/46 |
| 2004/0124044 | A1 | * | 7/2004 | Landrieve ................. 188/218 R |
| 2007/0273362 | A1 | * | 11/2007 | Nakajima et al. ............. 324/174 |

FOREIGN PATENT DOCUMENTS

EP   0908729 A1   4/1999

* cited by examiner

*Primary Examiner* — Alan B Waits
*Assistant Examiner* — Brian McGovern
(74) *Attorney, Agent, or Firm* — Bryan Peckjian; SKF USA Inc. Patent Department

(57) ABSTRACT

This rolling bearing (1) comprises an inner ring (12), an outer ring (14), rolling bodies (16) between said inner and outer rings, an encoder washer (32) fast in rotation with said inner ring and a support member (18) having an internal surface (26) in the form of a section of a sphere, the internal surface being adapted to be in sliding contact with a corresponding external surface (28) of the outer ring (14) which is also in the form of a section of a sphere. The support member (18) is provided with means (100; 200; 300; 400) to hold a sensor (50) with respect to the encoder washer (32), in a position where the sensor can detect a rotation of the encoder washer.

19 Claims, 5 Drawing Sheets

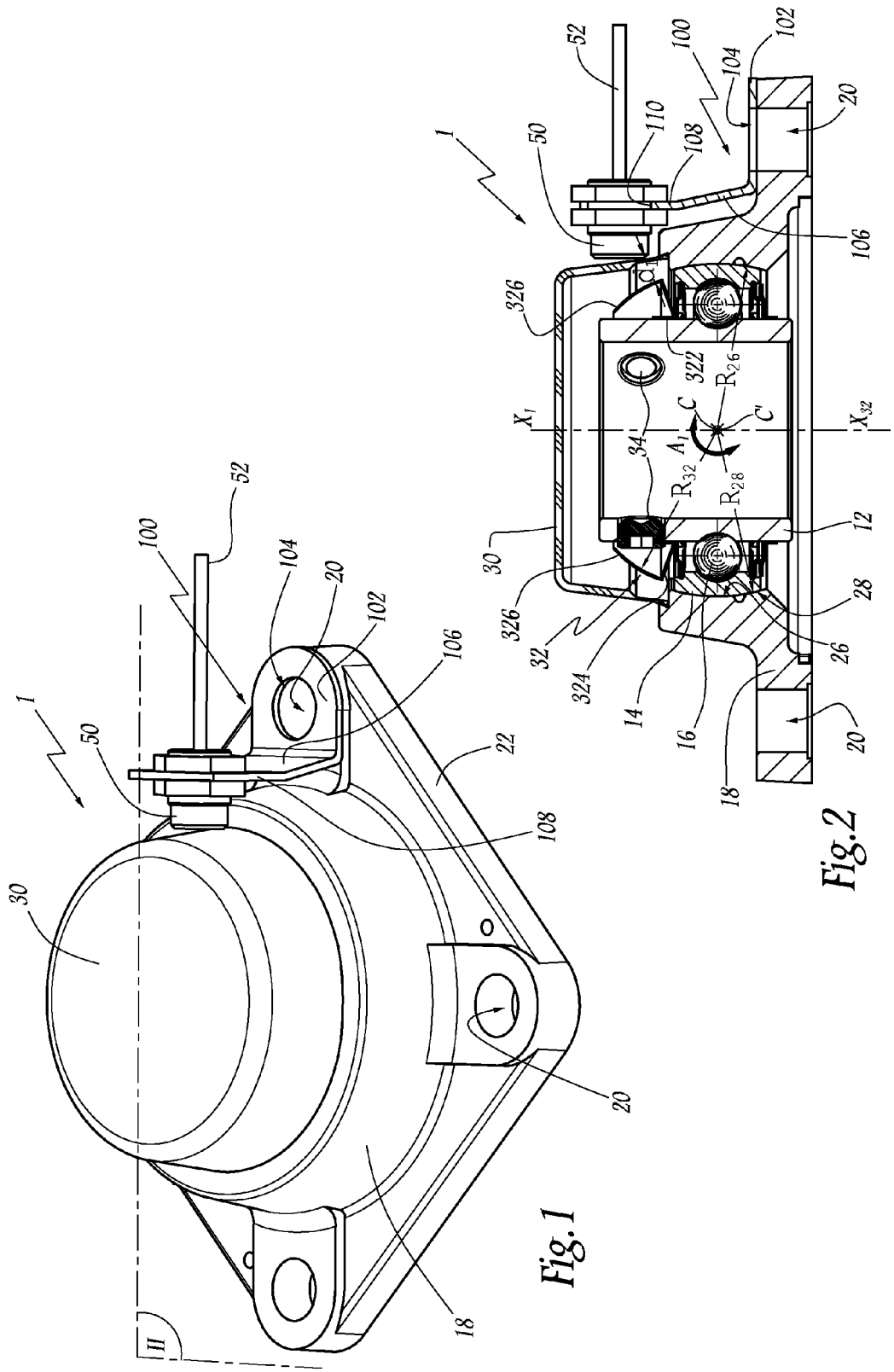

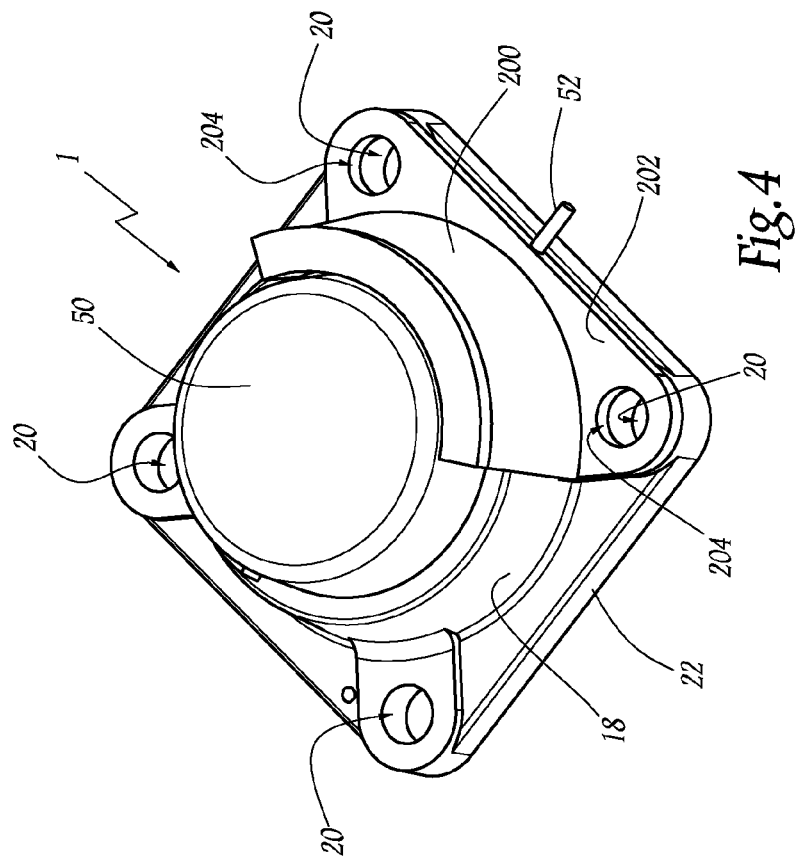
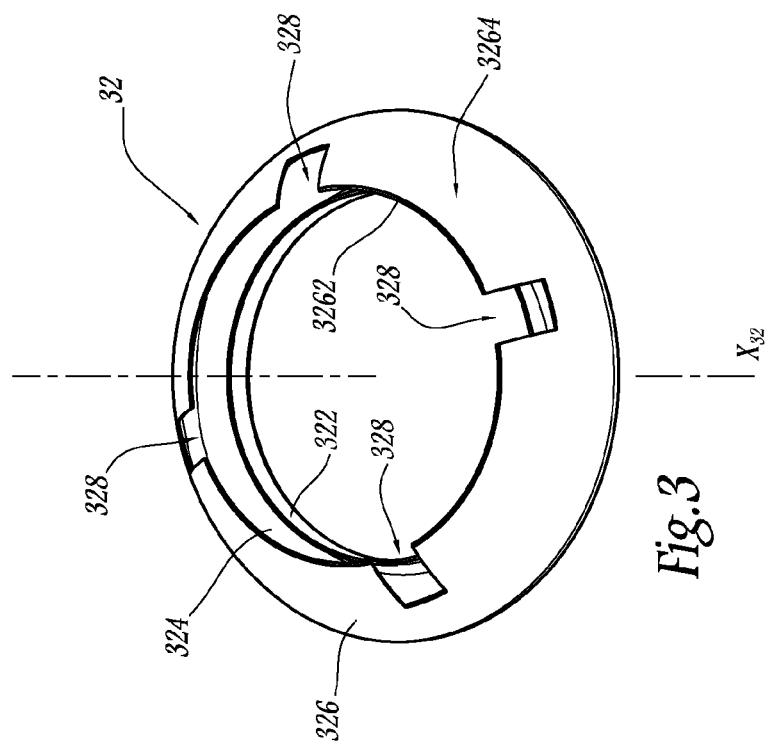

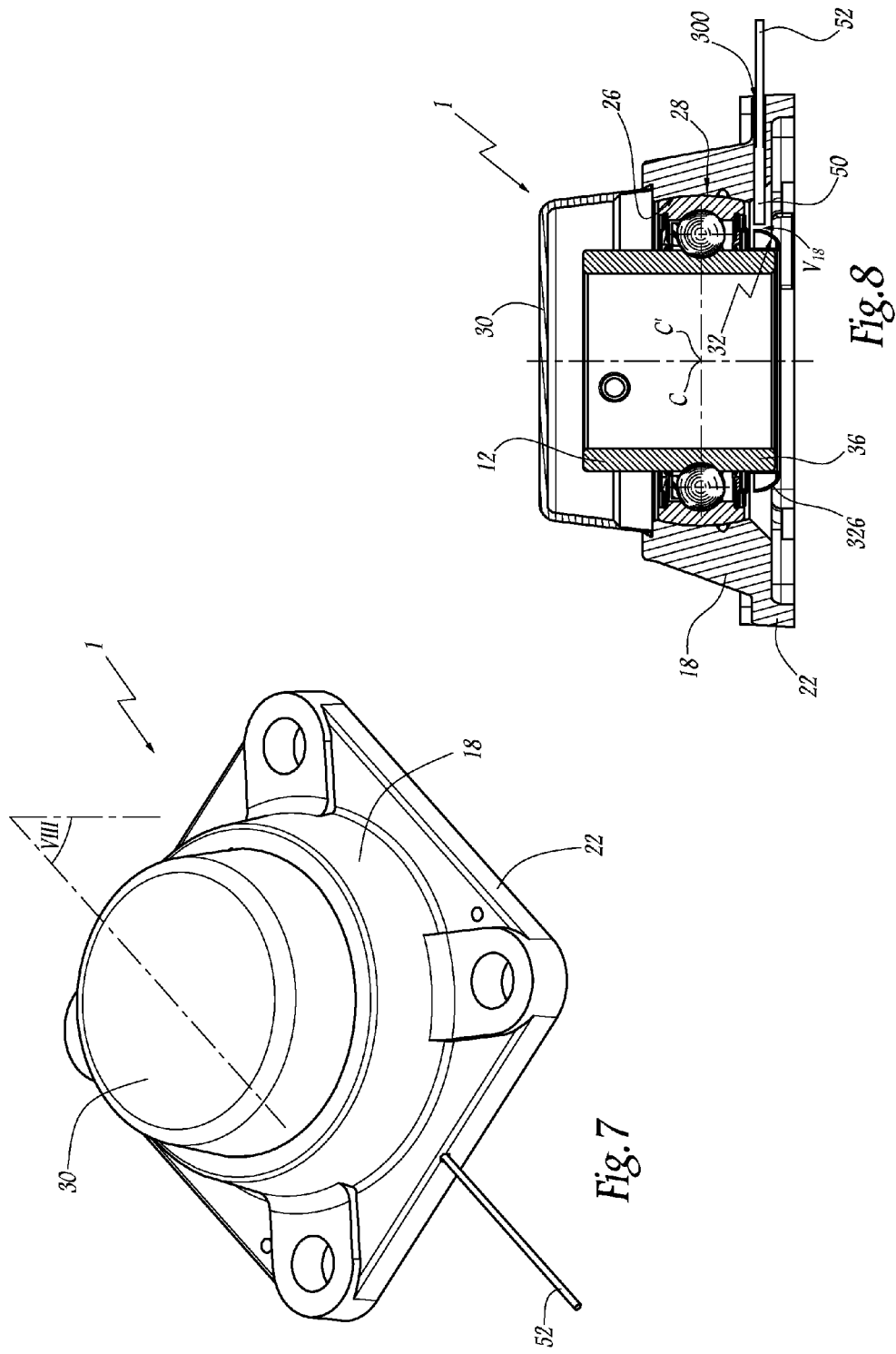

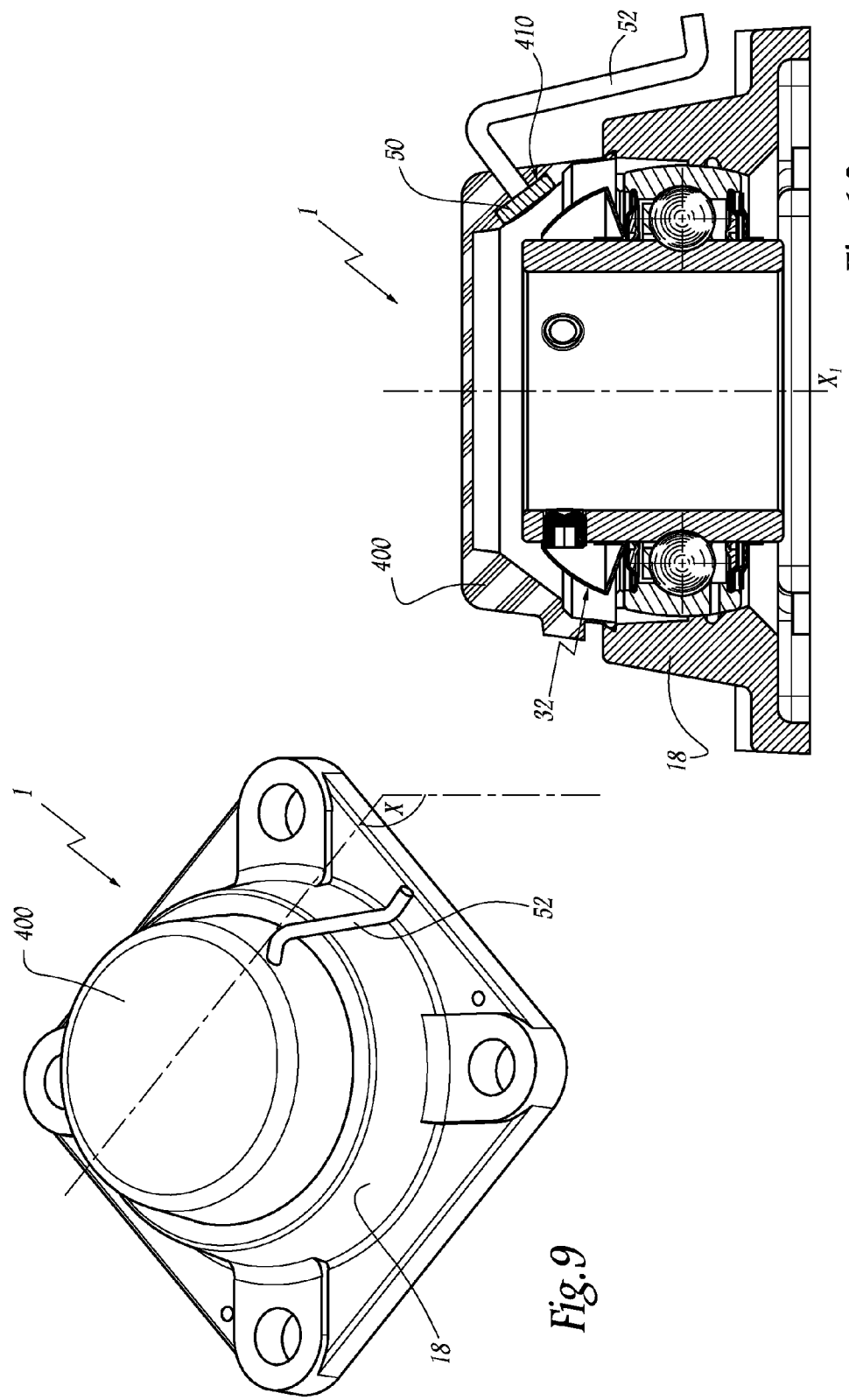

ROLLING BEARING WITH INTEGRATED SENSOR

TECHNICAL FIELD OF THE INVENTION

This invention relates to a so-called insert bearings or Y-bearings with an integrated sensor. An insert bearing is a bearing whose outer ring is housed within a support member, with a possibility of rotational movement in all directions, in order to accommodate a possible misalignment between an axis of a fixed part and an axis of a rotative part. Such bearings can be used, for instance, in belt conveyers or similar devices.

BACKGROUND OF THE INVENTION

In some instances, it is necessary to know a rotation parameter of an insert bearing, e.g. to determine the speed of a belt conveyer. EP-A-0 908 729 discloses a bushed bearing where a sensor target is fixed to an inner ring and rotates in front of a sensor which is held close to this target and mounted on a sealing device fixed on the outer ring of the bearing. Several relatively complex parts must be mounted within the bushing with high precision. This increases the complexity and the cost of the bearing. Moreover, since the sensor is indirectly mounted on the outer ring, it is relatively difficult to feed with electrical current and some electrical cables must extend from a fixed part of the bushing to the outer ring, with a risk that these cables be damaged.

SUMMARY OF THE INVENTION

The invention aims at solving these problems with a new rolling bearing where a rotation parameter can be determined in a simple economic and reliable way.

To this end, the invention concerns a rolling bearing comprising an inner ring, an outer ring, rolling bodies between the inner and outer rings, an encoder washer fast in rotation with the inner ring and a support member having an internal surface in the form of a section of a sphere, this internal surface being adapted to be in sliding contact with a corresponding external surface of the outer ring which is also in the form of a section of a sphere. This rolling bearing is characterized in that the support member is provided with means to hold a sensor with respect to the encoder washer, in a position where the sensor can detect rotation of the encoder washer.

Thanks to the invention, it is not necessary to use the outer ring of the bearing to support the sensor. The means of the invention, which hold the sensor with respect to the support member, are actually mounted on the support member and they can be relatively simple and inexpensive. Moreover, mounting of the sensor on the support member, via the holding means, is easier and faster than mounting it on the outer ring. The invention makes use of the fact that a sensor does not need to be in the immediate proximity of an encoder washer in order to fulfill its rotation detection function. For instance, a Hall effect sensor can detect rotation of an encoder washer within a distance of about 10 mm.

According to further aspects of the invention, which are advantageous but not compulsory, the rolling bearing might incorporate one or several of the following features:

The encoder washer has at least one external surface which is in the form of a section of a sphere centered on a point which belongs to a rotation axis of the inner ring. Such an external surface is adapted to an effective detection of the rotation of the encoder washer even when the outer ring rotates with respect to the support member, thanks to a sliding movement of its external surface on the corresponding internal surface of the support member. In such a case, the distance between the sensor and the geometrical surface advantageously has a fixed value when the inner ring rotates with respect to the outer ring and when the external surface of the outer ring slides over the internal surface of the support member.

The sensor is removably mounted on the support member.

The sensor is a magnetic sensor, preferably an inductive sensor or a Hall effect cell.

The means to hold the sensor include a bracket mounted on the support member, this bracket forming a housing which accommodates the sensor. Such a bracket can be a metallic tongue removably mounted on the support member and which has a hole where the sensor is immobilized by cooperation of shapes. Alternatively, the bracket can be overmoulded around the sensor and removably mounted on the support member.

The means to hold the sensor include a cavity formed within the support member, the sensor being installed within this cavity which opens into an interior volume of the support member. This cavity can be a hole which extends in the support member along a direction radial with respect to a rotation axis of the encoder washer.

The rolling bearing also comprises a cover mounted on the support member to isolate the inner and outer rings from the outside and the sensor is mounted on this cover.

The means to hold the sensor can be mounted on the support member in one or several predetermined positions such that the sensor is held by these means in a position to detect a rotation of the encoder washer.

The encoder washer is a metallic ring with parts in relief.

BRIEF DESCRIPTION OF THE DRAWINGS

The invention will be better understood on the basis of the following description which is given in correspondence with the annexed figures and as an illustrative example, without restricting the object of the invention. In the annexed figures:

FIG. 1 is a perspective view of a rolling bearing according to a first embodiment of the invention;

FIG. 2 is a cut view along line II-II on FIG. 1;

FIG. 3 is a perspective view of an encoder washer of the bearing of FIGS. 1 and 2;

FIG. 4 is a perspective view of a bearing according to a second embodiment of the invention;

FIG. 7 is a perspective view of a bearing according to a third embodiment of the invention;

FIG. 8 is a cut view in plane VIII on FIG. 7;

FIG. 9 is a perspective view of a ring bearing according to a fourth embodiment of the invention; and FIG. 10 is a cut view in plane X on FIG. 9.

DETAILED DESCRIPTION OF THE INVENTION

Figure 6:
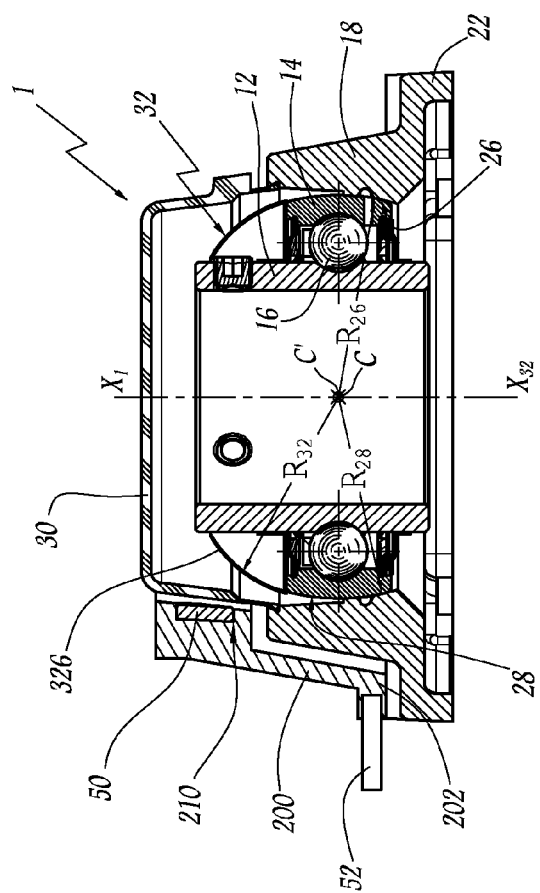
FIG. 6 is an enlarged cut view along line VI-VI on FIG. 5.

The bearing 1 represented on FIGS. 1 to 3 is an insert bearing or Y-bearing comprising an inner ring 12, an outer ring 14, a series of balls 16 and a support member or housing 18 provided with four holes 20 where non-represented screws can be inserted to immobilize support member 18 with respect to a non-represented structure, such as a frame of a belt conveyer.

Support member 18 has a square base 22 and holes 20 are located next to the corners of base 22.

$X_1$ denotes a central axis of bearing 1. Inner ring 12 rotates around axis $X_1$ with respect to outer ring 14. Actually, axis $X_1$ is aligned with a central axis $X_{12}$ of ring 12 which is an axis of symmetry of the internal surface 24 of ring 12.

Support member 18 has an internal surface 26 which is in the form of a section of a sphere centered on a point C which belongs to axis $X_1$. On the other hand, outer ring 14 is provided with an external surface 28 which is also in the form of a section of a sphere centered on point C. Actually, surfaces 26 and 28 have radiuses $R_{26}$, $R_{28}$ which have the same value so that surfaces 26 and 28 are corresponding surfaces which can slide one on the other in order to allow a pivoting movement of a sub-assembly, comprising items 12, 14 and 16 around point C, with respect to support member 18, as shown by arrow $A_1$. This enables to accommodate a possible misalignment between axis $X_1$ and a central axis of a shaft inserted within ring 12, while still permitting rotation of ring 12 with respect to ring 14.

A cover 30 is mounted on support member 18 in order to isolate items 12 to 16 from the outside, on the upper side of FIGS. 1 and 2.

An encoder washer 32 is mounted around inner ring 12 thanks to several screws screwed in corresponding threads of inner ring 12, two of these screws being shown on FIG. 2, with reference 34. The same screws can be used to lock in rotation and axially the inner ring 12 onto the non-represented shaft inserted within ring 12, in a configuration well known as "grub screw locking". The geometry of encoder washer 32 can be derived from FIGS. 2 and 3. Encoder washer 32 is made in one piece out of a pressed iron sheet. It has a cylindrical wall 322 with a circular cross-section and an internal radius equal to the external radius of ring 12 which also has a circular cross-section. Wall 322 is fitted around ring 12. Encoder washer 32 also has a frustroconical wall 324 which connects cylindrical wall 322 to an outer cylindrical wall 326 which has a circular cross-section and a generatrix in the form of an arc of a circle. Therefore, wall 326 is in the form of a section of a sphere. $X_{32}$ denotes a central axis for washer 32. Axis $X_{32}$ is an axis of symmetry for walls 322, 324 and 326. Wall 326 converges towards axis $X_{32}$ when going away from wall 324. Wall 326 is provided with four notches 328 which open on the edge 3262 of wall 326 opposite to wall 324. Wall 326 is centered on a point C' which belongs to central axis $X_{32}$.

$R_{32}$ denotes the radius of the external surface 3264 of wall 326 which is also in the form of a section of a sphere centered on point C'. The value of $R_{32}$ is smaller than the value of $R_{26}$ and $R_{28}$. This prevents encoder washer 32 to come in contact with the housing or support member 18 upon rotation of the inner and outer rings 12 and 14 with respect to inside the housing support member 18.

When encoder washer 32 is mounted on inner ring 12 and when items 12, 14 and 16 are installed within support member 18, axes $X_1$ and $X_{32}$ are aligned and points C and C' are superimposed.

A magnetic sensor 50 is mounted on bearing 1, in a position to detect rotation of encoder washer 32 around axis $X_1$. Sensor 50 is an inductive sensor which is connected by an electrical cable 52 to a non-represented electronic control unit.

Sensor 50 is held in position with respect to encoder washer 32 thanks to a bracket made of a metallic tongue 100 folded in order to define a first section 102 with a hole 104 supposed to be aligned with one of holes 20 and to be crossed by a non-represented screw when support member 18 is mounted on a structure. Bracket 100 also forms an intermediate section 106 and a terminal or upper section 108 where a hole 110 is defined to accommodate sensor 50 in the position of FIGS. 1 and 2 where the distance $d_1$ between sensor 50 and wall 326 is such that sensor 50 can efficiently detect the rotation of encoder washer 32 in order to determine a rotation parameter of rolling bearing 1.

Actually, $d_1$ has preferably a value less than 15 mm.

A rotation parameter of one part of rolling bearing 1 with respect to another part of this rolling bearing is a parameter which is representative of the pivoting movement of one part with respect to the other. Such a parameter can be an angle, measuring the angular position of one part with respect to the other, around a central axis of the bearing. Such a parameter can also be a speed, a displacement, an acceleration or a vibration. Sensor 50 detects the successive passages of each notch 328 of encoder washer 32 in front of sensor 50, which gives some information with respect to the rotation of encoder washer 32.

The number of notches of encoder washer 32 can be different from 4, e.g. between 2 and 8. This number does not have to be high insofar as only a few pulses per rotation of washer 32 can be generated by sensor 50 to constitute a low resolution tachometer.

If the sub-assembly comprising items 12, 14 and 16 rotates with respect to support member 18, around point C, as shown by arrow $A_1$, and thanks to a sliding movement of surface 28 with respect to surface 26, the distance $d_1$ between surface 3264 and sensor 50 remains constant since surface 3264 is a section of a sphere centered on the same point C-C' as surfaces 26 and 28. In other words, the sliding movement of items 12, 14 and 16 with respect to support member 18 does not interfere with the detection of a rotation parameter by sensor 50.

According to an advantageous aspect of the invention, sensor 50 is a product available on the market and does not have to be specially designed and configured to fulfill its function. Its cost can therefore be very low since inductive sensors are widely used in industry. The geometry of hole 110 is adapted to lock sensor 50 on tongue 100 by cooperation of shapes.

Figure 5:
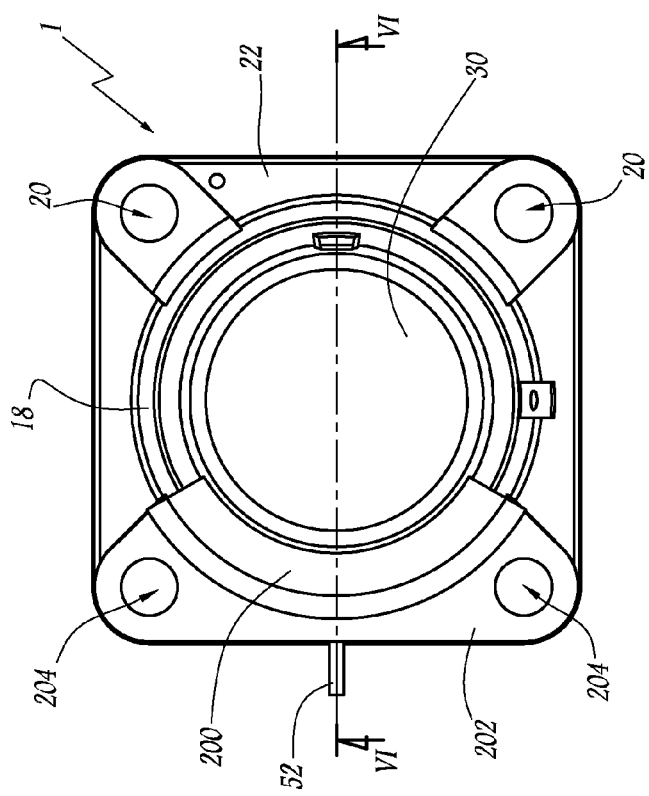
FIG. 5 is a top view of the bearing of FIG. 4.

In the second embodiment of the invention represented on FIGS. 4 to 6, the same elements as in the first embodiment have the same references. The bearing 1 of this embodiment also has an inner ring 12, an outer ring 14, balls 16 and a support member 18. Surfaces 26 and 28 in the form of section of spheres are respectively provided on support member 18, as an internal surface, and on outer ring 14, as an external surface. These surfaces are centered on a point C which belongs to a central axis $X_1$ of bearing 1. A cover 30 and an encoder washer 32 are also provided, the encoder washer being substantially the same as in the first embodiment and having an outer wall 326 whose external surface is a part of a spherical surface centered on a point C' which is superimposed with point C when bearing 1 is mounted.

In this embodiment, a bracket is formed by a synthetic cover 200 overmoulded around a sensor 50 and which comprises a base section 202 where two holes 204 are supposed to be aligned with the holes 20 provided near the corners of the base 22 of support member 18. A cable 52, which connects sensor 50 to a non-represented electronic control unit is also overmoulded in cover 200. The path of cable 52 is not represented on FIG. 6, since it is not in the plane of this figure.

As in the first embodiment, mounting cover 200 on support member 18, by aligning its holes 204 on the holes 20 of base member 22 automatically positions sensor 50 with respect to encoder washer 32 in a position which permits this sensor to detect the rotation of encoder washer 32 around axis $X_1$.

In this embodiment, the sensor 50 is mechanically protected by cover 200 which forms a housing 210 around sensor 50. Moreover, cable 52 comes out of cover 200 near base 22, that is close to the structure on which bearing 1 is mounted.

In the third and fourth embodiments of the invention represented on FIGS. 7 to 10, the elements which are similar or identical to the ones of the first and second embodiments bear the same references. Hereafter, mainly the differences between the third and fourth embodiments with respect to the first embodiment are described.

In the third embodiment represented on FIGS. 7 and 8, the encoder washer 32 is mounted next to the lower end 36 of inner ring 12 of a bearing 1, that is next to the end of inner ring 12 which is close to the base 22 of support member 18. Encoder washer 32 also has an outer wall 326 whose external surface is a section of a sphere centered on a point C' which is superimposed with the center C of two surfaces 26 and 28 respectively provided on support member 18 and outer ring 14.

A bore 300 is drilled in base 22, along a direction which is radial with respect to axis $X_1$. This permits to introduce within the internal volume $V_{18}$ of support member 18 an elongated sensor 50 connected by an electric cable 52 to a non-represented electronic control unit.

Non-represented means, such as screws or clamps can be used to immobilize sensor 50 within bore 300.

In the fourth embodiment of the invention represented on FIGS. 9 and 10, the sensor 50 of a bearing 1 is mounted within a cover 400 which is snapped onto the support member 18 and has the same function of protection as cover 30 in the first embodiment. A cable 52 connects sensor 50 to a non-represented electronic control unit.

Cover 400 is overmoulded over sensor 50. Alternatively, sensor 50 is glued or locked by cooperation of shapes in a housing 410 of cover 400.

Snapping of cover 50 onto support member 18 automatically positions sensor 50 with respect to the encoder washer 32 which is similar to the one of the first embodiment, so that proper detection of the rotation of this washer around a central axis $X_1$ of bearing 1 can be obtained.

In all embodiments, the geometry of the encoder washer 32 is such that the distance between this ring and the sensor 50, as defined by distance $d_1$ in the first embodiment, remains constant, even if the outer ring 14 slides with respect to the support member or housing 18.

In all embodiments, instead of an encoder washer 32 with an outer wall provided with notches, one can use an encoder washer whose outer wall is made by several tabs separated by empty spaces, the union of the external surfaces of these tabs forming an external surface which is included in a section of a sphere. One can also use an encoder washer with magnetized portions, the external surface of such a magnetized washer having also the form of a section of a sphere. In the case where the encoder washer has magnetized portions, the sensor might advantageously be of the Hall effect type, instead of an inductive sensor.

Different types of sensors can be used with the invention, e.g. a magnetic sensor, an inductive sensor or a capacitive sensor.

The invention can be used with any type of rolling bearings, roller bearings, needle bearings, etc. . . . .

The invention claimed is:

1. A rolling bearing comprising:
an inner ring defining a rotation axis,
an outer ring having a partially spherical external surface,
a plurality of rolling bodies disposed between the inner and outer rings,
an encoder washer fixed relative to the inner ring such that the encoder washer rotates and pivots with the inner ring, the encoder washer including at least one partially spherical surface,
a sensor, and
a support member having a partially spherical internal surface adapted to slidingly contact the external surface of the outer ring and a holder configured to hold the sensor at a position where the sensor detects rotation of the encoder washer,
wherein a distance between the sensor and the at least one partially spherical surface of the encoder washer has a fixed value when the inner ring rotates with respect to the outer ring and when the inner ring and the outer ring pivot with respect to the sensor.

2. The rolling bearing according to claim 1, wherein said sensor is removably mounted on the support member.

3. The rolling bearing according to claim 1, wherein said sensor is a magnetic sensor.

4. The rolling bearing according to claim 1, wherein the holder includes a bracket mounted on the support member and forming a housing configured to accommodate the sensor.

5. The rolling bearing according to claim 4, wherein the bracket includes a metallic tongue removably mounted on the support member and the housing is provided by a hole shaped to retain the sensor.

6. The rolling bearing according to claim 4, wherein the bracket is overmoulded around the sensor and is removably mounted on the support member.

7. The rolling bearing according to claim 1, wherein the support member has an interior volume and the holder includes a cavity formed within the support member and opening into the interior volume, the sensor being installed within the cavity.

8. The rolling bearing according to claim 7, wherein the encoder washer has a rotation axis and the cavity is formed as a hole extending within the support member radially with respect to the rotation axis of the encoder washer.

9. The rolling bearing according to claim 1, further comprising a cover mounted on the support member and configured to isolate the inner and outer rings from an exterior environment, the sensor being mounted on the cover.

10. The rolling bearing according to claim 1, wherein the holder is mountable on the support member in at least one predetermined position such that the sensor is located to detect rotation of the encoder washer.

11. The rolling bearing according to claim 1, wherein the encoder washer is a metallic ring having notches.

12. The rolling bearing according to claim 1, wherein the sensor is one of an inductive sensor and a Hall Effect sensor.

13. The rolling bearing according to claim 1, wherein the inner ring pivoting changes an orientation of the rotation axis with respect to the support member.

14. The rolling bearing according to claim 1, wherein a convex side of the at least one spherical surface faces toward the sensor and a concave surface of the at least one spherical surface faces away from the sensor.

15. The rolling bearing according to claim 14, wherein the distance is defined on one side by the convex side of the at least one spherical surface.

16. A rolling bearing comprising:
an inner ring defining a rotation axis,
an outer ring having a partially spherical external surface,
a plurality of rolling bodies disposed between the inner and outer rings, an encoder washer fixed relative to the inner ring such that the encoder washer rotates and pivots with the inner ring, the encoder washer including at least one partially spherical surface, a sensor, and a support member having a partially spherical internal surface adapted to slidingly contact the external surface of the outer ring and a holder configured to hold the sensor at a position where the sensor detects rotation of the encoder washer, wherein a distance between the sensor and the at least one partially spherical surface of the encoder washer has a fixed value when the inner ring rotates with respect to the outer ring and when the encoder washer pivots with respect to the sensor, and wherein the at least one partially spherical surface of the encoder washer is defined by a radius of curvature that is centered on a point on the rotation axis of the inner ring, the point being axially offset from the encoder washer.

17. The rolling bearing according to claim 16, wherein the external surface of the outer ring slides on the internal surface of the support member when the outer ring pivots with respect to the support member.

18. The rolling bearing according to claim 16, wherein the external surface of the outer ring defines a radius of curvature that is also centered on the point on the rotation axis.

19. The rolling bearing according to claim 16, wherein the distance between the sensor and the at least one partially spherical surface of the encoder washer has the fixed value when the inner ring and the outer ring pivot with respect to the sensor.

* * * * *